(12) United States Patent
Ducheneaut et al.

(10) Patent No.: US 8,956,218 B2
(45) Date of Patent: Feb. 17, 2015

(54) SYSTEM AND METHODS FOR DYNAMICALLY ADJUSTING GAME COMPONENTS BASED ON A USER'S PROFILE

(71) Applicant: Palo Alto Research Center Incorporated, Palo Alto, CA (US)

(72) Inventors: Nicolas B. Ducheneaut, Sunnyvale, CA (US); Nicholas K. Yee, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 13 days.

(21) Appl. No.: 13/722,916

(22) Filed: Dec. 20, 2012

(65) Prior Publication Data

US 2014/0179408 A1 Jun. 26, 2014

(51) Int. Cl.
*G06F 17/00* (2006.01)
*G07F 17/32* (2006.01)
*A63B 24/00* (2006.01)

(52) U.S. Cl.
CPC ............. *G07F 17/326* (2013.01); *A63B 24/00* (2013.01); *G07F 17/3237* (2013.01)

USPC .......................................................... 463/23

(58) Field of Classification Search
CPC ............... A63F 2003/0489; A63F 2300/1012; A63F 2300/6027; A63F 2300/63; A63F 2300/632; G06Q 50/22
USPC .......................................................... 463/23
See application file for complete search history.

(56) References Cited

U.S. PATENT DOCUMENTS

| | | | |
|---|---|---|---|
| 6,290,602 B1 * | 9/2001 | Kawano | 463/23 |
| 2002/0074727 A1 * | 6/2002 | Glaser | 273/429 |
| 2005/0053902 A1 * | 3/2005 | Vladimirovich | 434/236 |
| 2012/0315986 A1 * | 12/2012 | Walling | 463/31 |
| 2014/0128166 A1 * | 5/2014 | Tam et al. | 463/42 |
| 2014/0157171 A1 * | 6/2014 | Brust et al. | 715/771 |

* cited by examiner

*Primary Examiner* — Dmitry Suhol
*Assistant Examiner* — Carl V Larsen
(74) *Attorney, Agent, or Firm* — Shun Yao; Park, Vaughan, Fleming & Dowler LLP

(57) ABSTRACT

One embodiment of the present invention provides a system for adjusting a number of game mechanics associated with a game system. During operation, the system obtains a psychosocial profile associated with a user, adjusts the game mechanics based on the obtained psychosocial profile, and updates the game system based on the adjusted game mechanics.

21 Claims, 5 Drawing Sheets

SYSTEM AND METHODS FOR DYNAMICALLY ADJUSTING GAME COMPONENTS BASED ON A USER'S PROFILE

This invention was made with government support under FA8650-10-C-7008 by The Intelligence Advanced Research Projects Activity (IARPA) Reynard Program. The government has certain rights in the invention.

BACKGROUND

1. Field

This disclosure is generally related to gamification and video games. More specifically, this disclosure is related to a game system that is capable of dynamically adjusting the game mechanics according to the profile of the player.

2. Related Art

Gamification is a newly emerged concept, which refers to the use of game mechanism and game design in a non-game context. It is often used as a way to encourage users to engage in desired behaviors by providing game-like rewards, such as points, badges, leaderboards, etc. For example, certain websites that promote health and fitness, such as Fitocracy and QUENTIQ, encourage their users to exercise more by awarding users with varying numbers of points for activities they perform in their workout. The users can also gain levels based on points collected, and complete quests and gain achievement badges. In addition, enterprises trying to lure their employees into performing certain tasks, including training, completing surveys, or investing in their retirement account, also want to gamify these experiences for their employees. Gamification is also used by marketers and website product managers as a tool for customer engagement, and encouraging desirable website usage behavior.

Just like different game players have different motivations for playing, users of the gamified applications are also motivated differently when completing the tasks. Decades of research in the field of the video game has demonstrated that, in general, game players can be clustered into four groups (achievers, explorers, socializers, and killers) based on their motivation for "figuring out" the game, roaming the game world, interacting with other players, and competing with other players, respectively. Recent research has also identified ten game-playing motivations that fall into three higher-level categories related to achievement, social, and immersion motivations.

SUMMARY

One embodiment of the present invention provides a system for adjusting a number of game mechanics associated with a game system. During operation, the system obtains a psychosocial profile associated with a user, adjusts the game mechanics based on the obtained psychosocial profile, and updates the game system based on the adjusted game mechanics.

In a variation on this embodiment, the system further observes the user's behavior while the user is using the game system, and re-adjusts the game mechanics based on the observed user behavior.

In a further variation, the system updates the psychosocial profile associated with the user based on the observed user behavior.

In a variation on this embodiment, the psychosocial profile includes at least one of: Big Five personality traits and a number of socio-demographic variables.

In a further variation, the socio-demographic variables include one or more of: age, gender, ethnicity, and body mass index (BMI).

In a variation on this embodiment, adjusting the game mechanics involves at least one of: activating a first game mechanic and deactivating a second game mechanic.

In a variation on this embodiment, the game mechanics include at least one of: game mechanics that provide achievement motivations to the user, game mechanics that provide social motivations to the user, and game mechanics that provide immersion motivations to the user.

BRIEF DESCRIPTION OF THE FIGURES

In the figures, like reference numerals refer to the same figure elements.

DETAILED DESCRIPTION

Figure 1:
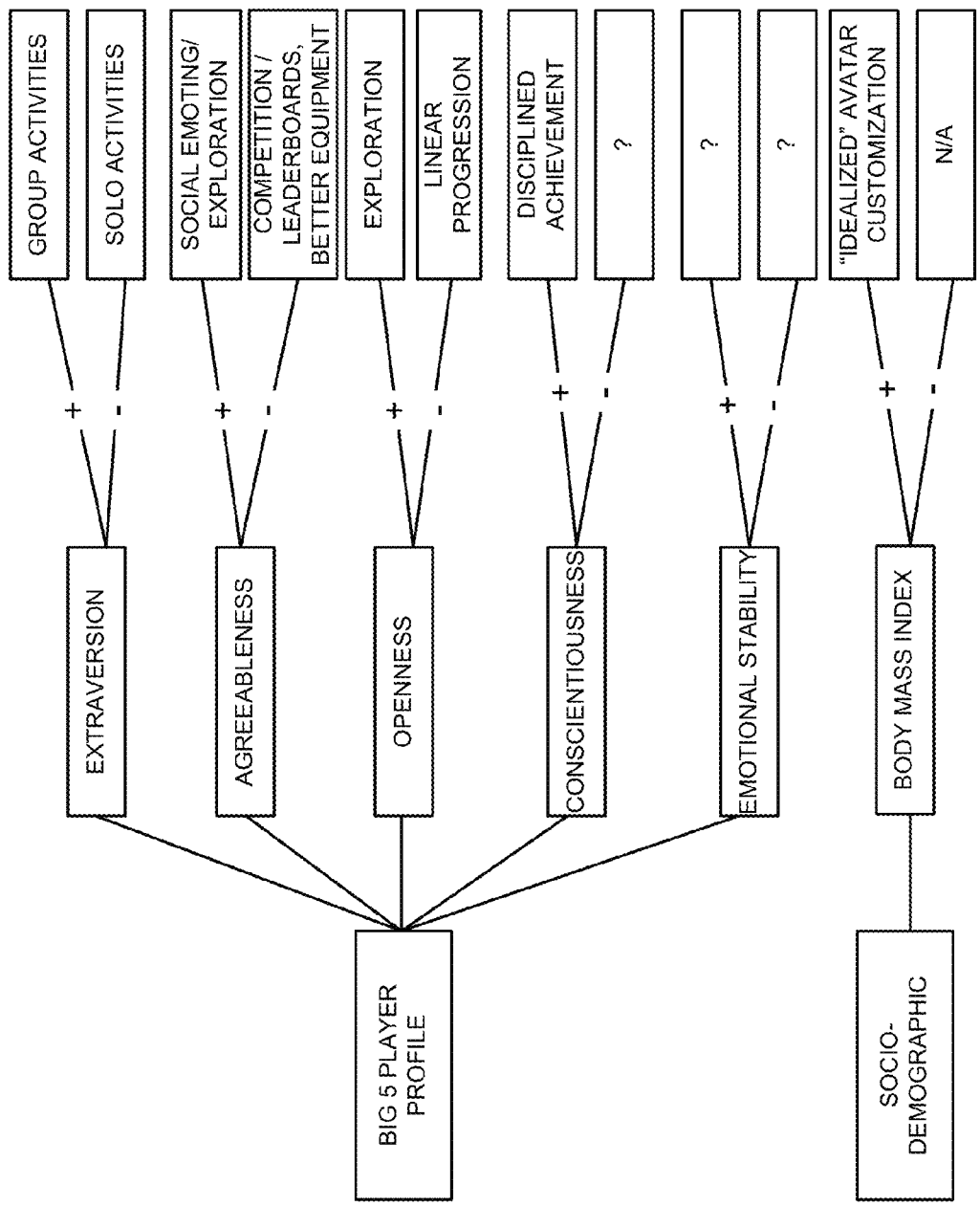
FIG. 1 presents a diagram illustrating the correlation between a user's psychosocial profile and various game mechanics.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a video game or gamification system that is capable of dynamically adjusting game mechanics according to a user's profile. More specifically, the system collects users' psychosocial profiles, links the psychosocial variables of a user to various game mechanics, and adjusts the property of the game accordingly. The system further dynamically balances the game components based on observed user behaviors.

In this disclosure, the term "user" refers to people who play the video games or use the gamified applications. The terms "user" and "player" are interchangeable.

In this disclosure, the term "gamification" not only refers to the idea of infusing game design techniques and game mechanics into non-game applications, but also refers to applications that are gamified. The term "gamification" and the term "game" are interchangeable in this disclosure.

Dynamic Customization Engine

Because different game players are often motivated differently in playing games, conventional game designers are often faced with a choice: either design games with one group of players in mind, making these players very engaged while ignoring other groups of players; or design games using a "one-size-fits-all" approach by including a large palette of game activities to satisfy all possible player motivations. The latter approach has been the dominant one taken by the game designers, particularly for large online games that attract millions of players. Similarly, the various gamified web applications (also called gamifications) that try to appeal to a broad audience also take a so-called "shotgun" approach to game mechanics, which are constructs of rules and feedback loops intended to produce enjoyable gameplay. In other words, a user of these gamifications is presented with multiple game mechanics (such as points, badges, leaderboards, etc.), and is required to use all the mechanics, even if he is only interested in collecting points.

The aforementioned "shotgun" approach for designing game mechanics or a game-like environment in gamifications is sub-optimal, from both the user's and the designer's point of view. The user faces lots of useless content (i.e., content that does not appeal to him or users of the same type). The designer, on the other hand, has to design video game components in a way that is generic enough to appeal to the multiple types of game players, at the cost of "dumbing down" the most extreme variant that would have really appealed to one player type.

To solve these problems, embodiments of the present invention provide a game or gamification system that dynamically adjusts game mechanics based on the player's personality profile as well as a number of socio-demographic variables associated with the player. More specifically, the system uses a player's psychosocial profile (the combination of personality and demographic variables) as a proxy for his player type, and maps that psychosocial profile with available game mechanics. The system then adjusts the game environment accordingly to emphasize the game mechanics most enjoyable for that player type.

Recent research has demonstrated that a user's personality profile (for example, as measured by the Big Five personality traits) strongly correlates with specific game mechanics that the user finds most enjoyable. Note that the Big Five personality traits measure a person's personality in five broad domains or dimensions, including openness, conscientiousness, extraversion, agreeableness, and neuroticism (also known as emotional stability). For example, a user with a strong extraversion trait (most likely to be a socializer) may find it most enjoyable to participate in a game that includes group activities; on the other hand, a user with a strong conscientiousness trait (most likely to be an achiever) may find it most enjoyable to amass points or collect badges.

FIG. 1 presents a diagram illustrating the correlation between a user's psychosocial profile and various game mechanics. As one can see from the figure, each of the Big Five factors either positively (indicated by the "+" sign) or negatively (indicated by the "−" sign) correlates with certain game mechanics, with the exception of the emotional stability factor, with which no correlation to game mechanics has been found. As shown in FIG. 1, the extraversion factor positively correlates with group activities, while negatively correlating with solo activities; the agreeableness factor positively correlates with social emoting as well as exploration, while negatively correlating with competition (such as leaderboards) and equipment; the openness factor positively correlates with exploration, while negatively correlating with linear progression; and the conscientiousness factor positively correlates with the disciplined achievement (such as badges, points, levels, etc.). In addition, a user's socio-demographic data, such as age, gender, body mass index (BMI), etc., also correlates with certain game mechanics. FIG. 1 shows that the BMI factor may positively correlate with an "idealized" avatar.

Figure 2:
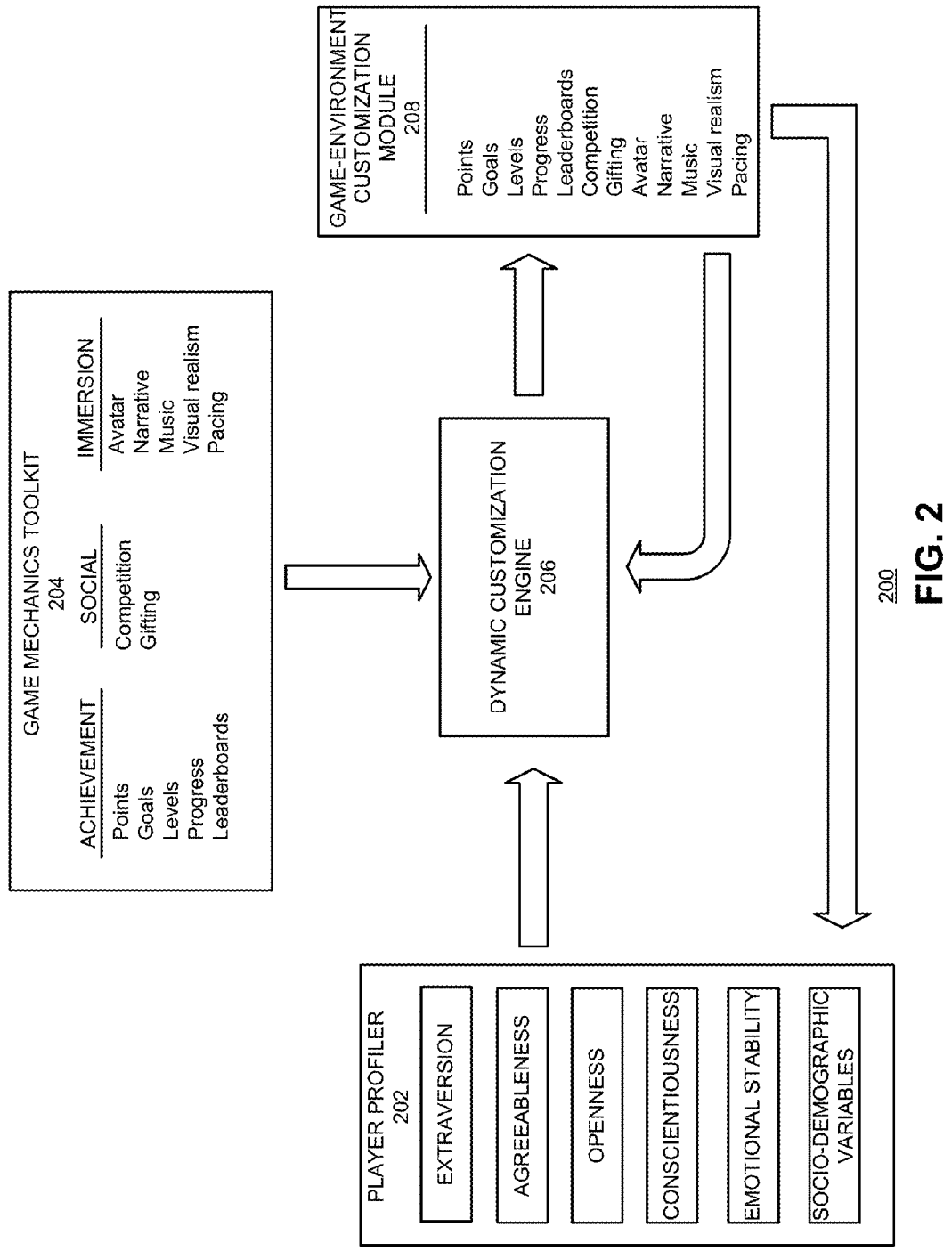
FIG. 2 presents a diagram illustrating an exemplary gamification system, in accordance with an embodiment of the present invention.

FIG. 2 presents a diagram illustrating an exemplary gamification system, in accordance with an embodiment of the present invention. Gamification system 200 includes a player profiler 202, a game mechanics toolkit 204, a dynamic customization engine 206, and a game-environment customization module 208.

Player profiler 202 obtains and stores psychosocial profiles of users. In one embodiment, the psychosocial profile of a user includes his Big Five personality trait and a number of socio-demographic variables. In a further embodiment, the socio-demographic variables include, but are not limited to: age, gender, ethnicity, education, BMI, etc. The psychosocial profile of a user can be obtained by requesting the user to fill out a questionnaire or take a personality test while signing up for an account; or it can be inferred from observing the user's behavior while he participates in the game or gamification. In one embodiment, the psychosocial profile of a user is expressed as a vector, with each dimension linked to a Big Five factor or a socio-demographic variable.

Game mechanics toolkit 204 stores game mechanics available for the current game or gamification. When designing the game, the designer may includes a number of game mechanics, which can be categorized into three subsets based on the motivations they provide to users. In the example shown in FIG. 2, the game mechanics that provide the achievement motivation include points, goals, levels, progress bars, and leaderboards; the game mechanics that provide the social motivation include competition and gifting; and the game mechanics that provide the immersion motivation include avatar, narrative, music, visual realism, and pacing. Note that the system may use other game mechanics than the ones shown in FIG. 2. Moreover, certain game mechanics may fall within more than one category. For example, the game mechanics known as quests or challenges can provide both the achievement and the social (when designed as a competition) motivations.

Dynamic customization engine 206 is responsible for linking a player's psychosocial profile with the available game mechanics in game mechanics toolkit 204. Based on the player's psychosocial profile, game mechanics toolkit 204 adjusts the available game mechanics. In one embodiment, dynamic customization engine 206 may select or "play up" certain game mechanics while eliminating or "playing down" other game mechanics in game mechanics toolkit 204. For example, based on a player's psychosocial profile, the system may determine that he is interested in amassing points or obtaining levels (having a high level of conscientiousness), while disliking competition (having a high level of agreeableness). Consequently, dynamic customization engine 206 changes the setting of game mechanics toolkit 204 by making the points mechanics the most dominant one while eliminating the competition mechanics. On the other hand, if the psychosocial profile of a player indicates that he is more interested in the social aspect of playing the game, dynamic customization engine 206 will change the setting of game mechanics toolkit 204, making competition among players a dominant game component.

The output of dynamic customization engine 206 is then sent to game-environment customization module 208, which in turn customizes the game environment using the adjusted game mechanics including, but are not limited to: points, goals, levels, progress bars, leaderboards, competition, gifting, avatar, narrative, music, visual realism, and pacing. As a result, while playing the same game or using the same gamification, different players or users may see different game environments. Using a gamification whose goal is to encourage users to exercise as an example, the user who is more interested in amassing points while disliking competitions will be presented with an environment that rewards him with points each time he exercise, whereas a more sociable user will be presented with an environment that challenges him to compete with other users in the amount of exercises. Similarly, these two different users may also be presented with different game narratives or background music that appeal to the different personalities.

Moreover, game-environment customization module 208 provides feedback to dynamic customization engine 206 based on observed user behavior in the customized game environment, thus allowing dynamic customization engine 206 to re-adjust the game mechanics and game components to optimize their appeal to the user. Again, using the exercise-promoting gamification as an example, if the system determines that rewarding a user with points does not seem to make the user exercise more, dynamic customization engine 206 may replace the points mechanics with other game mechanics, such as leaderboards, to motivate the user to exercise more. Additionally, game-environment customization module 208 can also provide feedback to player profiler 202, to allow it to modify the stored player profile based on the observed player behavior, given that some users may lie or make mistakes when completing the personality test.

Figure 3:
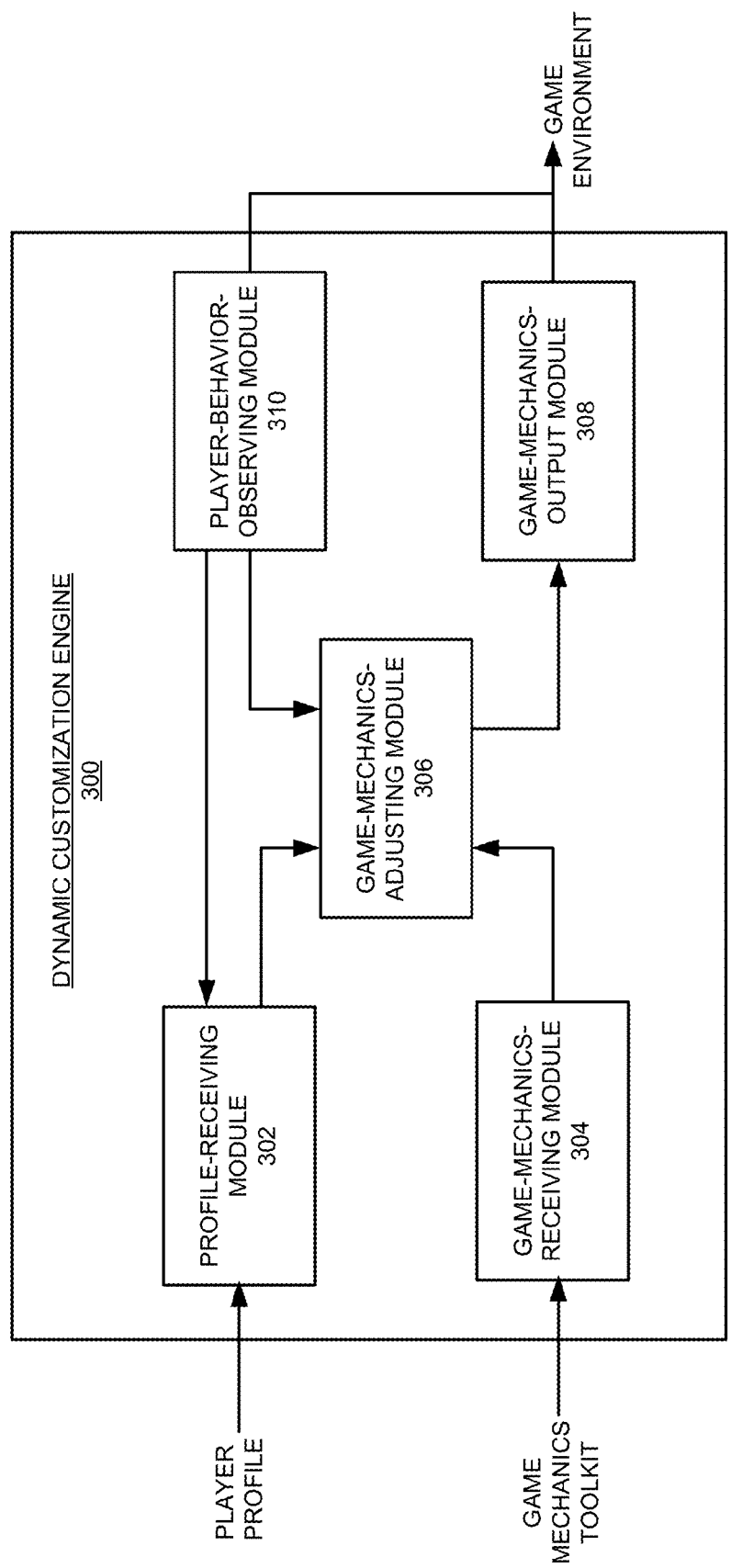
FIG. 3 presents a diagram illustrating the architecture of an exemplary dynamic customization engine, in accordance with an embodiment of the present invention.

FIG. 3 presents a diagram illustrating the architecture of an exemplary dynamic customization engine, in accordance with an embodiment of the present invention. Dynamic customization engine 300 includes a profile-receiving module 302, a game-mechanics-receiving module 304, a game-mechanics-adjusting module 306, a game-mechanics-output module 308, and a player-behavior-observing module 310.

Profile-receiving module 302 is responsible for receiving the psychosocial profile of the current player. In one embodiment, profile-receiving module 302 receives the player profile from a player-profile database, which can be part of the game system or an external database. Game-mechanics receiving module 304 receives a number of available game mechanics from the game mechanics toolkit. Note that the available game mechanics are the game mechanics that have been included as part of the game by the game designer. For example, a game designer may want to use both points and badges as a way of rewarding a user for completing a task.

Game-mechanics-adjusting module 306 performs the task of adjusting each of the received game mechanics individually based on the player's psychosocial profile. In one embodiment, game-mechanics-adjusting module 306 may activate or deactivate certain game mechanics, or it may adjust the intensity of a particular game mechanic. For example, game-mechanics-adjusting module 306 can make competition with other players a major part of the game activities if the player is very sociable, or a minor part of the game activities if the player is less sociable.

The adjusted game mechanics are then sent to game-mechanics output module 308, which outputs the adjusted game mechanics to the game environment, thus causing the game environment to change accordingly. Player-behavior-observing module 310 observes the game-playing behavior of the player, and sends feedback to game-mechanics-adjusting module 306, thus allowing game-mechanics-adjusting module 306 to adjust the game mechanics dynamically. In one embodiment, this dynamic adjustment may occur within one game session. In another embodiment, this dynamic adjustment may occur within a longer time scale, such as over the lifetime of the game being played by the user. Moreover, player-behavior-observing module 310 also sends feedback to profile-receiving module 302 in order to update a player's profile based on his game-playing behavior.

Figure 4:
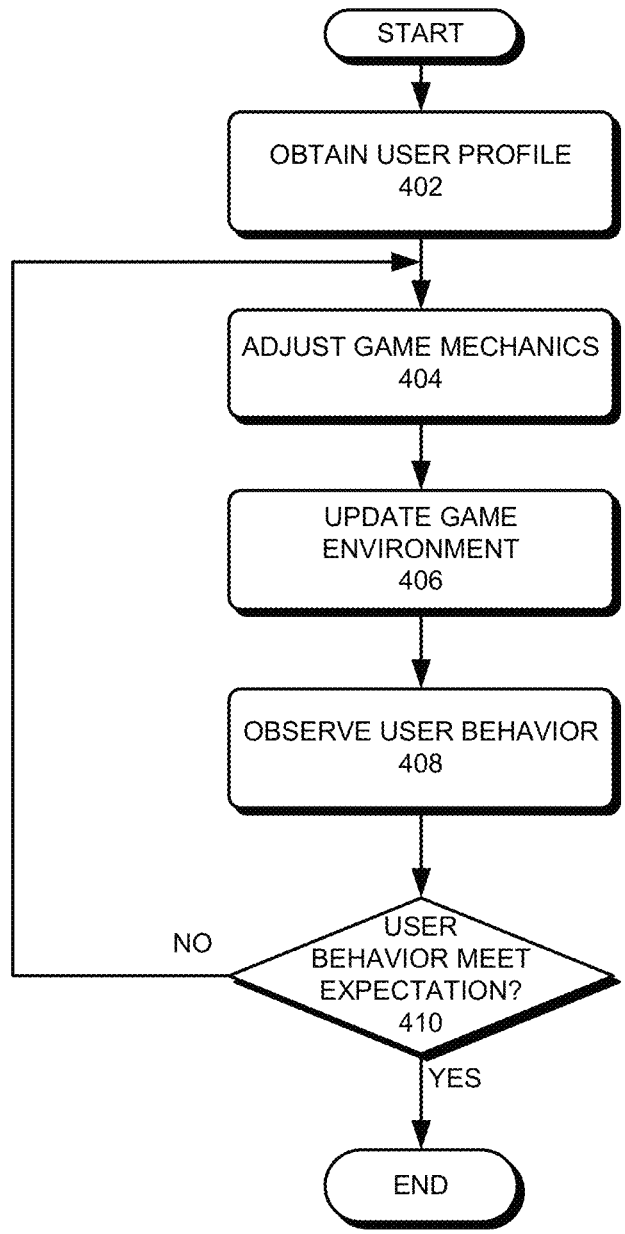
FIG. 4 presents a flowchart illustrating an exemplary process of dynamically updating a game environment based on a user's profile, in accordance with an embodiment of the present invention.

FIG. 4 presents a flowchart illustrating an exemplary process of dynamically updating a game environment based on a user's profile, in accordance with an embodiment of the present invention. During operation, the system obtains a user's psychosocial profile (operation 402). In one embodiment, the user's psychosocial profile includes the user's Big Five personality traits and socio-demographic variables associated with the user. Based on the user's psychosocial profile, the system adjusts the available game mechanics (operation 404). In one embodiment, the system may activate certain game mechanics while deactivating other game mechanics. In a further embodiment, the system may choose a variation of one game mechanic. For example, when designing the game, the designer may include multiple narratives of the game theme, and one of the narratives will be activated based on the player's profile.

Subsequently, the system uses the adjusted game mechanics to update the game environment (operation 406). While the user is playing the game, the system further observes the user's game-playing behavior (operation 408), and determines whether the observed user behavior meets expectation (operation 410). In one embodiment, the system determines whether the activated game mechanics have sufficiently motivated the user in performing the desired task. For example, if the desired task is exercising, the system determines whether allowing the user to gain points each time he exercises has motivated him to exercise more. If the outcome is negative (e.g, the user has not exercised more), the system re-adjusts the game mechanics (operation 404). For example, instead of using points to motivate the user, the system may present the user with a challenge from his co-worker or family members. In one embodiment, the system can also update the user's profile based on the observed game-playing behavior of the user.

Computer System

Figure 5:
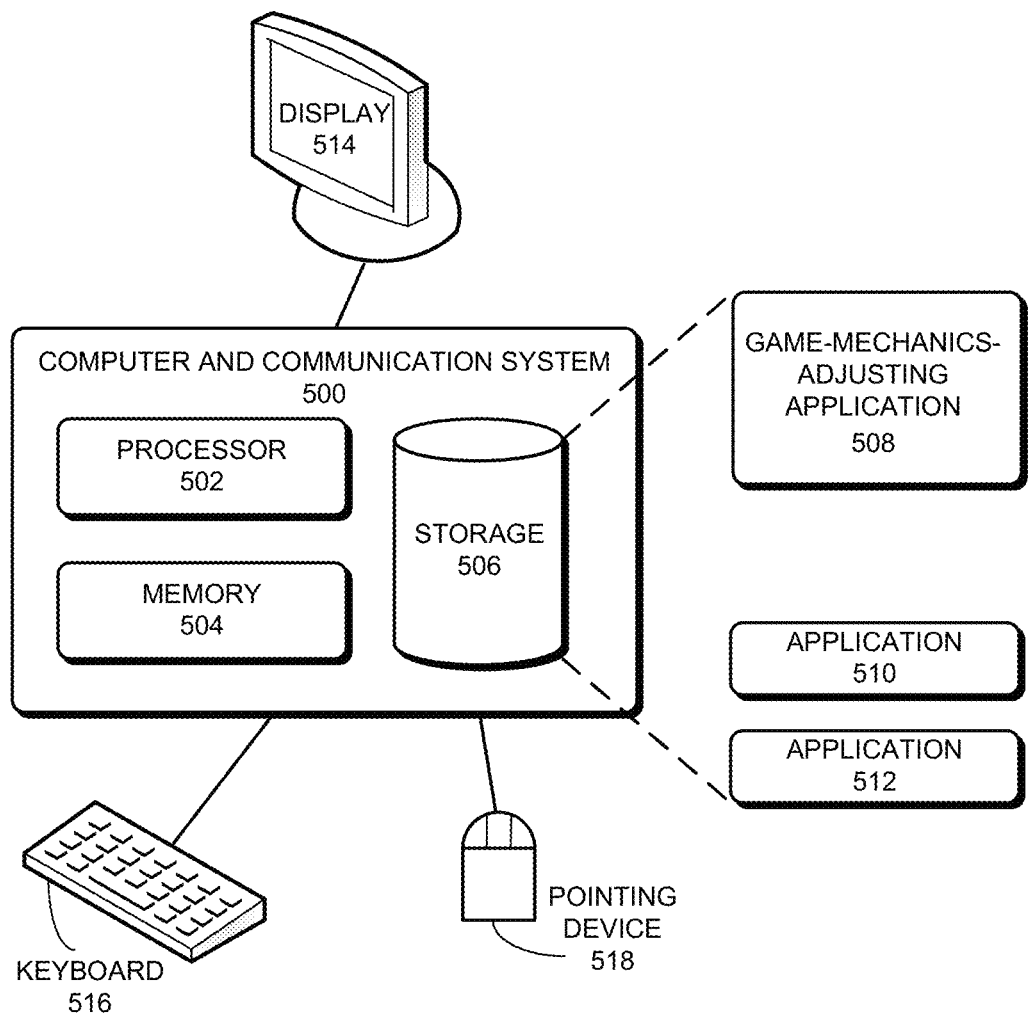
FIG. 5 illustrates an exemplary computer system for dynamically adjusting game mechanics, in accordance with one embodiment of the present invention.

FIG. 5 illustrates an exemplary computer system for dynamically adjusting game mechanics, in accordance with one embodiment of the present invention. In one embodiment, a computer and communication system 500 includes a processor 502, a memory 504, and a storage device 506. Storage device 506 stores a game-mechanics-adjusting application 508, as well as other applications, such as applications 510 and 512. During operation, game-mechanics-adjusting application 508 is loaded from storage device 506 into memory 504 and then executed by processor 502. While executing the program, processor 502 performs the aforementioned functions. Computer and communication system 500 is coupled to an optional display 514, keyboard 516, and pointing device 518.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for adjusting a set of game mechanics associated with a video game environment, the method comprising:
    loading, by a computing device, a game-mechanics-adjusting application from storage into memory;
    obtaining a psychosocial profile associated with a user, wherein the psychosocial profile includes at least one personality trait that influences the user's participation in a video game environment of a video game system;
    selecting, by the computing device, a game mechanic that controls an aspect of the video game environment, and is positively correlated to a personality trait of the psychosocial profile, wherein a respective game mechanic positively correlates to a personality trait of users that experience an increased enjoyment in participating in the video game environment when the video game system adjusts the game mechanic to influence the users;
    adjusting the game mechanic to motivate the user to perform a task within the video game environment;
    determining whether the adjusted game mechanic has motivated the user to perform the task; and
    responsive to determining that the adjusted game mechanic has not motivated the user, adjusting one or more other game mechanics that controls other aspects of the video game environment.

2. The method of claim 1, further comprising:
    observing the user's behavior while the user is using the video game environment; and
    re-adjusting the game mechanics based on the observed user behavior.

3. The method of claim 2, further comprising:
    updating the psychosocial profile associated with the user based on the observed user behavior.

4. The method of claim 1, wherein the psychosocial profile includes at least one of:
    Big Five personality traits; and
    a number of socio-demographic variables.

5. The method of claim 4, wherein the socio-demographic variables include one or more of:
    age;
    gender;
    ethnicity; and
    body mass index (BMI).

6. The method of claim 1, wherein adjusting the game mechanics involves at least one of:
    activating a first game mechanic; and
    deactivating a second game mechanic.

7. The method of claim 1, wherein adjusting the game mechanics includes at least one of:
    activating game mechanics that leverages one or more of points, goals, levels, progress bars, and leader boards to motivate the user to achieve a task;
    activating one of game mechanics that leverages competition and gifting to motivate the user to socialize; and
    activating one of game mechanics that leverages one or more of an avatar, a narrative, music, visual realism, and pacing to motivate the user through immersion.

8. A non-transitory, computer-readable storage medium storing instructions that when executed by a computer cause the computer to perform a method for adjusting a set of game mechanics associated with a video game environment, the method comprising:
    loading, by a computing device, a game-mechanics-adjusting application from storage into memory;
    obtaining a psychosocial profile associated with a user, wherein the psychosocial profile includes at least one personality trait that influences the user's participation in a video game environment of the video game system;
    selecting, by the computing device, a game mechanic that controls an aspect of the video game environment, and is positively correlated to a personality trait of the psychosocial profile, wherein a respective game mechanic positively correlates to a personality trait of users that experience an increased enjoyment in participating in the video game environment when the video game system adjusts the game mechanic to influence the users;
    adjusting the game mechanic to motivate the user to perform a task within the video game environment;
    determining whether the adjusted game mechanic has motivated the user to perform the task; and
    responsive to determining that the adjusted game mechanic has not motivated the user, adjusting one or more other game mechanics that controls other aspects of the video game environment.

9. The computer-readable storage medium of claim 8, wherein the method further comprises:
    observing the user's behavior while the user is using the video game environment; and
    re-adjusting the game mechanics based on the observed user behavior.

10. The computer-readable storage medium of claim 9, wherein the method further comprises:
    updating the psychosocial profile associated with the user based on the observed user behavior.

11. The computer-readable storage medium of claim 8, wherein the psychosocial profile includes at least one of:
    Big Five personality traits; and
    a number of socio-demographic variables.

12. The computer-readable storage medium of claim 11, wherein the socio-demographic variables include one or more of:
    age;
    gender;
    ethnicity; and
    body mass index (BMI).

13. The computer-readable storage medium of claim 8, wherein adjusting the game mechanics involves at least one of:
    activating a first game mechanic; and
    deactivating a second game mechanic.

14. The computer-readable storage medium of claim 8, wherein adjusting the game mechanics includes at least one of:
    activating game mechanics that leverages one or more of points, goals, levels, progress bars, and leader boards to motivate the user to achieve a task;

activating one of game mechanics that leverages competition and gifting to motivate the user to socialize; and activating one of game mechanics that leverages one or more of an avatar, a narrative, music, visual realism, and pacing to motivate the user through immersion.

15. A game system, comprising:

one or more processors;

a memory storing instructions that when executed by the one or more processors cause the one or more processors to perform a method for adjusting a set of game mechanics associated with a video game environment, the method comprising:

loading, by a computing device, a game-mechanics-adjusting application from storage into memory;

obtaining a psychosocial profile associated with a user, wherein the psychosocial profile includes at least one personality trait that influences the user's participation in a video game environment of a video game system;

selecting, by the computing device, a game mechanic that controls an aspect of the video game environment, and is positively correlated to a personality trait of the psychosocial profile, wherein a respective game mechanic positively correlates to a personality trait of users that experience an increased enjoyment in participating in the video game environment when the video game system adjusts the game mechanic to influence the users;

adjusting the game mechanic to motivate the user to perform a task within the video game environment;

determining whether the adjusted game mechanic has motivated the user to perform the task; and responsive to determining that the adjusted game mechanic has not motivated the user, adjusting one or more other game mechanics that controls other aspects of the video game environment.

16. The game system of claim 15, wherein the method further comprises:

observing the user's behavior while the user is using the video game environment; and re-adjusting the game mechanics based on the observed user behavior.

17. The game system of claim 16, wherein the method further comprises: updating the psychosocial profile associated with the user based on the observed user behavior.

18. The game system of claim 15, wherein the psychosocial profile includes at least one of:

Big Five personality traits; and a number of socio-demographic variables.

19. The game system of claim 18, wherein the socio-demographic variables include one or more of:

age;

gender;

ethnicity; and body mass index (BMI).

20. The game system of claim 15, wherein adjusting the game mechanics involves at least one of:

activating a first game mechanic; and deactivating a second game mechanic.

21. The game system of claim 15, wherein adjusting the game mechanics includes at least one of:

activating game mechanics that leverages points, goals, levels, progress bars, and leader boards to motivate the user to achieve a task;

activating one of game mechanics that leverages competition and gifting to motivate the user to socialize; and activating one of game mechanics that leverages one or more of an avatar, a narrative, music, visual realism, and pacing to motivate the user through immersion.

* * * * *